(12) United States Patent
Orlov et al.

(10) Patent No.: US 6,382,904 B1
(45) Date of Patent: May 7, 2002

(54) WINDMILL POWERPLANT

(76) Inventors: Igor Sergeevich Orlov, 111141, Zeleny prospekt, 4-1-84; Emmanuil Avraamovich Sobol, 121165, ul. Studencheskaya, 44-23-140; Mikhail Andreevich Egorov, 115563, ul.Shipilovskaya, 23-2-59, all of Moscow (RU)

( * ) Notice: Subject to any disclaimer, the term of this patent is extended or adjusted under 35 U.S.C. 154(b) by 0 days.

(21) Appl. No.: 09/341,889

(22) PCT Filed: Jun. 30, 1998

(86) PCT No.: PCT/RU98/00199

§ 371 Date: Jul. 16, 1999

§ 102(e) Date: Jul. 16, 1999

(87) PCT Pub. No.: WO99/49214

PCT Pub. Date: Sep. 30, 1999

(30) Foreign Application Priority Data

Mar. 25, 1998 (RU) .......................... 98104527

(51) Int. Cl.$^7$ ................. F03D 1/02; F03D 1/04
(52) U.S. Cl. ............. 415/4.5; 415/4.3; 415/60; 415/148; 415/908; 415/1
(58) Field of Search ............. 415/4.5, 4.3, 60, 415/905, 906, 908, 148, 211.2, 1; 290/55, 44; 60/398

(56) References Cited

U.S. PATENT DOCUMENTS

| | | | |
|---|---|---|---|
| 2,476,643 A | * 7/1949 | Wald et al. ............. | 415/148 |
| 4,021,135 A | * 5/1977 | Pedersen et al. ............. | 415/908 |
| 4,132,499 A | * 1/1979 | Igra ............. | 415/908 |
| 4,166,596 A | * 9/1979 | Mouton, Jr. et al. ............. | 415/4.5 |
| 4,204,799 A | * 5/1980 | de Geus ............. | 415/4.5 |
| 4,320,304 A | * 3/1982 | Karlsson et al. ............. | 415/908 |
| 5,464,320 A | 11/1995 | Finney ............. | 415/4.5 |

FOREIGN PATENT DOCUMENTS

| | | |
|---|---|---|
| DE | 29 29 734 | 4/1981 |
| FR | 891687 | 3/1944 |
| RU | 8970 | 4/1929 |
| RU | 1176103 A | 10/1983 |
| RU | 1793096 A1 | 7/1993 |

* cited by examiner

*Primary Examiner*—Christopher Verdier
*Assistant Examiner*—Richard Woo
(74) *Attorney, Agent, or Firm*—Knobbe, Martens, Olson & Bear, LLP

(57) ABSTRACT

A wind power unit, that uses the power of wind, is made as a support installed power-generating unit comprising at least one turbine with a nozzle apparatus mechanically connected to a generator, a central shell, an annular front shell having at least one input channel of the turbine that forms with the central shell an output channel of the turbine, and annular outside shell that forms with the central shell diffuser output channel. The power-generating unit is equipped with an additional annular shell forming with external surfaces of the front and central shells narrowing-expanding first intermediate channel connected in its intermediate part to turbine output channel, while, with the internal surface of the outside shell, a second intermediate channel connected long with the first intermediate channel is used to diffuse the output channel.

20 Claims, 4 Drawing Sheets

WINDMILL POWERPLANT

BACKGROUND OF THE INVENTION

1. Field of the Invention

The present invention relates to power engineering and, in particular, relates to a wind power generation unit, i.e., a unit for conversion of wind power to electrical or other energy to be used in industry, agriculture, etc.

2. Description of the Related Art

Long known are wind power units using kinetic energy of air flows by direct wind effect on turbine wind wheel blades. To increase the efficiency of the units, the pressure of the input flow before the wind wheel is changed, using diffusers and other structures of various geometric shapes that direct air flow. Units converting kinetic energy of air flow by direct effect on a wind wheel, Darrier rotors and the like have an essential disadvantage: blades are affected by irregular air flow that creates variable dynamic loads resulting in instability of generated electric current parameters. Significant power losses are related to application of multipliers to increase the number of revolutions of the generator rotor. To increase the efficiency of wind power generating units, it was suggested to double the effect on the turbine of an accelerated flow and rarefaction from the output channel side.

The station described in the patent comprises a turbine, a power generator, a unit to direct the air flow to the turbine made as a contractor and a unit to remove the air flow behind the turbine connected to the reduced pressure zone. Air intake parts of the station form channels that narrow in the middle part and are made to input external air flow from two sides. A separator distributes air flow entering the channel into two channels, inlet and outlet. One flow through an inlet orifice is directed, with a 270 degree turn, to the accumulation chamber where the power generator, the multiplier and the turbine are installed. An exhaust pipe of the latter is located in the air outlet chamber. The second flow accelerated in the channel creates rarefaction in the narrow section of the channel and provides output of the flow from the chamber though a system of air ducts with several turns in the outlet opening.

This station loses power in the flow coming to the accumulation chamber and to the turbine through an outlet opening due to several turns of the flow that creates an irregular velocity field, pressure, and temperatures in the accumulation chamber. A cumbersome multiplier in the input pipe of the turbine increases irregularity of the flow along the perimeter of the turbine input pipe. The multiplier also causes additional mechanical losses. Irregularity of the flow in the outlet chamber and flow turn by 270 degrees from the exit pipe of the turbine to the outlet opening prevent high efficiency of air flow energy transformation. Practical sue of the device in the stationary embodiment installed on the basement is extremely limited due to the impossibility of station orientation to wind direction.

The embodiment of the station installed on a tower also fails to provide self-orientation to the direction of the wind. Such design fails to provide the possibility of using the power of air flows streamlining the unit. Besides, input and output channels supplying the flow to chambers are located either laterally or in the middle of the unit, rather than on the entire channel perimeter. This precludes use of flow internal energy and its pressure energy.

A preferred design is the wind power-generating unit comprising an external shell, which is a central body installed on the axis of symmetry of the unit on the inside where a power generator is located. The generator shaft bears a turbine preceded by the contractor. Annular gaps between the central body and the cowl, the external shell internal surface, the outside surface of the cowl, and the internal surface of the external shell of the central body provide increases in the velocity of air flow in the channel minimum cross-sections and allow to increase its kinetic energy through reduction of its internal and pressure energy. The unit, essentially, has two stages which provide increase of flow velocity at the drop of pressure in channel minimum cross-sections. The boost of flows in the minimum cross-sections is achieved under the effect of energy of rarefaction in the basement shear of the unit and through energy coming to the air flow nozzle, in the first stage, and under the effect of rarefaction in the output cross-section of the exhaust pipe of the air turbine and energy coming to the input nozzle of the turbine of an air flow, in the second stage. However, a stable operational mode of this unit may be achieved only with rather large air flow velocities.

In the given invention, the indicated disadvantage is largely eliminated by the wind power-generating unit in the form of a power unit mounted on a support comprising at least one turbine with a nozzle apparatus mechanically connected to one or several generators, a central shell, an annular front shell with at least one input channel of the turbine forming an output channel with the central shell of the turbine, and an annular external shell forming a diffuser output channel with the central shell. The power-generating unit is equipped with an additional annular shell forming, with external surface of the front and central shells, a narrowing and expanding first intermediate channel connected in its intermediate part with the output channel of the turbine. With the internal surface of the outside shell, there is a second intermediate channel connected, along with the first intermediate channel, to the diffuser output channel. The back edge of the outside shell coincides with its maximum diameter. The input channel and the turbine are located in the center of the front shell. Input channels and turbines are located on the cross-sectional perimeter in the front shell. The generator is equipped with a cowl and is located in front of the turbine. The generator is located behind the turbine in the central shell. The turbine is equipped with two or several generators. The output part of the additional shell is made movable to change cross-section of adjacent channels. The output part of the front shell is made movable to change cross-section of adjacent channels. The trailing edge in it meridian plane has an angle of tangent declination to the external surface of the outside shell equal to 90–120 degrees relative to the plane of the basement shear of the shell. The support is made as a joint installed on the top of the column. The rotation axis of the joint is located along the wind flow in front of the center of power-generating unit wind pressure. At least one of the shells is filled with gas of a density less than that of ambient atmosphere. The support is made as a cable attached to the front part of the front shell. The cable is installed horizontally or with a slant, and its ends are attached at artificial or natural heights, while the power-generating unit is equipped with wings.

SUMMARY OF THE INVENTION

The aforementioned conceptual needs are satisfied by the formation and use of a wind power unit in the form of a support-installed power-generator. In one aspect, the wind power unit comprises a support, at least one turbine and mechanically connected to at least one generator, a central shell having an external surface, a front shell having an interior and exterior surface and a trailing edge and defining at least one input channel of the turbine with the front shell cooperating with the central shell to form a turbine output channel between the front shell and the central shell, and an annular external shell surrounding at least a portion of the central shell and cooperating with the central shell to form a diffuser output channel.

The wind power unit further comprises an additional annular shell having a trailing edge, the additional annular shell cooperating with the external surfaces of the front and central shells to form a narrowing-extending first intermediate channel that is connected in an intermediate part with the turbine output channel, the additional annular shell cooperating with the internal surface of the external shell to form a second intermediate channel that is connected with the first intermediate channel and with the diffuser output channel. The wind unit still further comprises a movable output part on the trailing edge of the additional annular shell, wherein the output part is movable to change a cross-section of the first and second intermediate channels, which increases the kinetic energy of the air flow through the first and second intermediate channels; and a movable output part on the trailing edge of the front shell, wherein the output part is movable to change a cross-section of the turbine output and first intermediate channels, which increases the kinetic energy of the air flow through the first and second intermediate channels.

In another aspect, the wind power unit comprises a back edge of the external shell, which coincides with a maximum diameter of the external shell. The input channel and the turbine are located in the center of the front shell. Plural input channels and turbines are located on a cross-sectional perimeter in the front shell. The generator is equipped with a cowl and is located in the central shell and in front of the turbine. The turbine is equipped with at least two generators with at least one of the generators located in front of the turbine and at least one of the generators located behind the turbine. The generator is equipped with a cowl and is located in the central shell and behind the turbine.

Additionally, the movable output part on the trailing edge of the additional annular shell and the movable output part on the trailing edge of the front shell streamline the air flow through the wind power unit to increase the rotational velocity of the at least one turbine. At the back edge in a meridian plane the angle of tangent declination to an external surface of the external shell equals to 90–120 degrees with respect to the plane of the basement shear of the shell. The power generating unit has a center of wind pressure, and wherein the support is made as a joint installed on a top of a column and located to have a joint rotation axis located in wind flow in front of the center of the wind pressure. At least one shell is filled with gas which density is less than that of air. The support is made as a cable fixed to a nose of the front shell. The cable is installed with an angular displacement including horizontal and an end of the cable is fixed at one of an artificial and natural heights such that wings are attached to the wind power unit in a manner so as to provide lift.

Furthermore, a method is provided for transforming energy of a first gas flow using a wind power unit in the form of a support-installed power-generator having at least one turbine mechanically connected to at least one generator. The method comprises accelerating the energy of a first gas flow in front of the turbine by using a component of the first gas flow, while simultaneously creating rarefaction behind the turbine by creating rarefaction across an output section of a profiled duct communicated to a minimum-section zone, where the first gas flow is affected by the component of the first gas flow streaming directly past a deflector. The method further comprises streaming the first gas flow past the outer envelope to produce rarefaction in the output section due to ejection; and creating multi-stage acceleration of the first gas flow, which increases the use of the energy of the first gas flow.

BRIEF DESCRIPTION OF THE DRAWINGS

The invention is explained in drawings.

DETAILED DESCRIPTION OF THE PREFERRED EMBODIMENT

Figure 1:
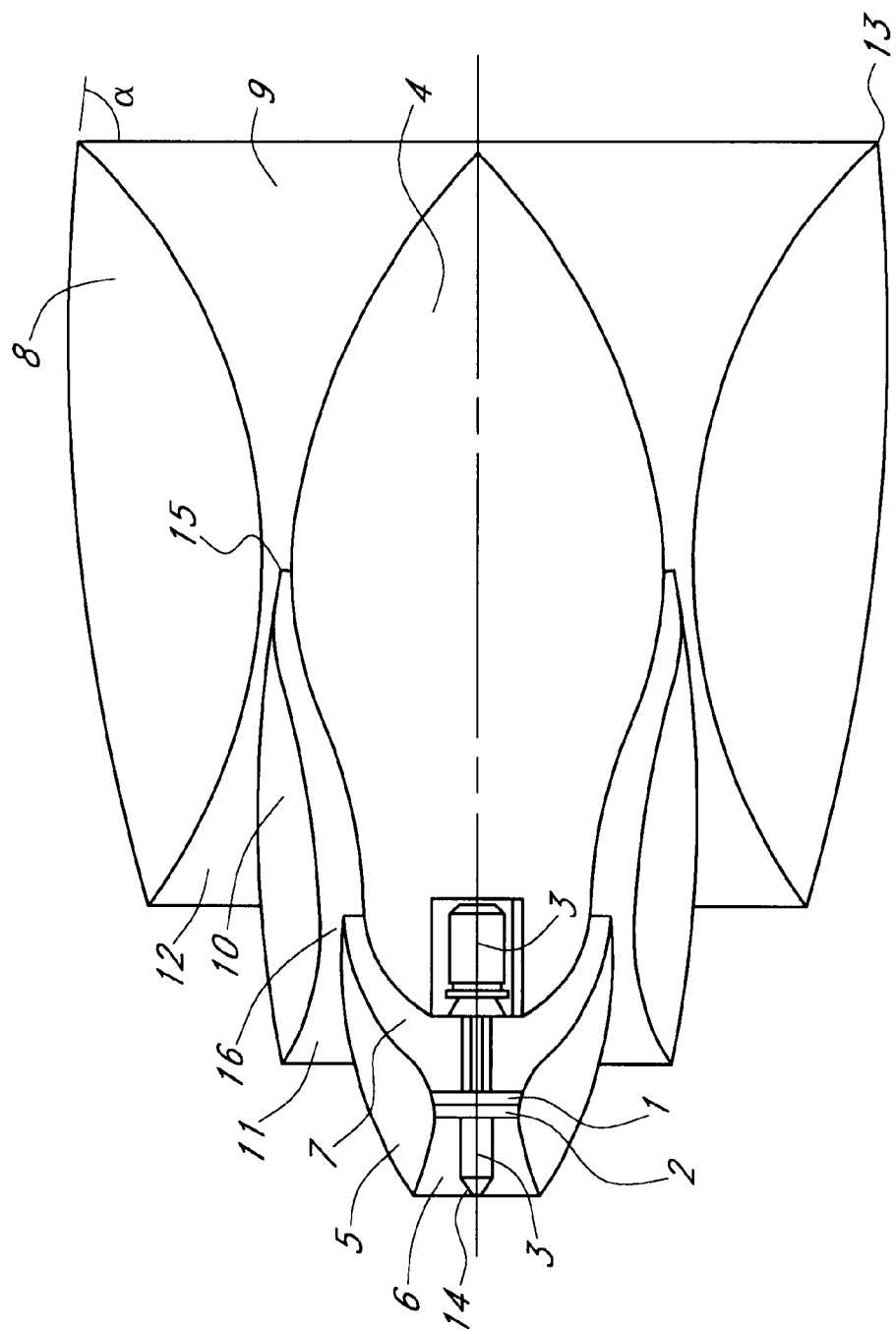
FIG. 1 shows the power-generating unit of the wind power unit.
Figure 2:
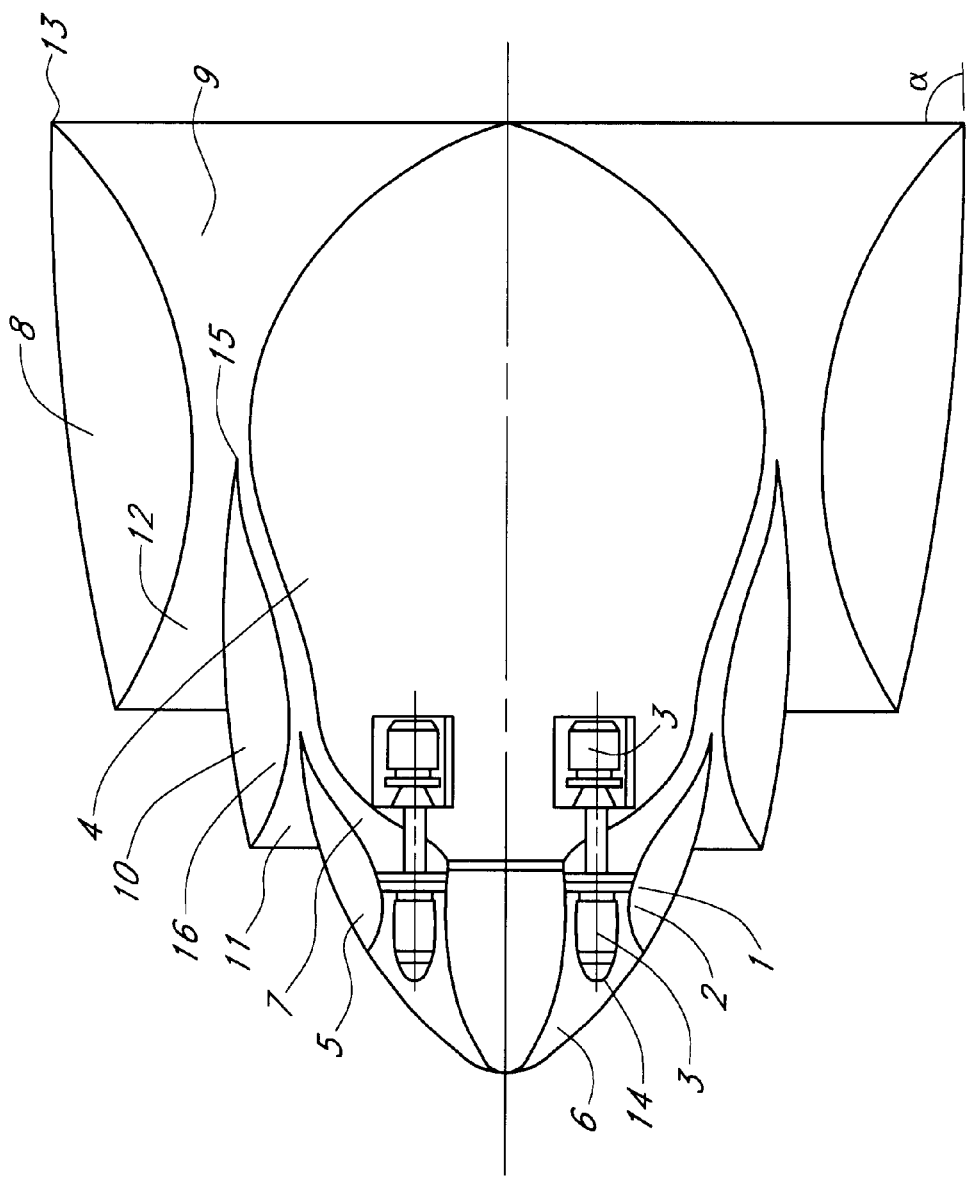
FIG. 2 shows the embodiment of the power-generating unit with several turbines.

The wind power unit is made as a power-generating unit installed on a support, comprising at least one turbine 1 with nozzle apparatus 2. The shaft of turbine 1 is mechanically connected to the generator 3. The term "generator" should be understood not only as an electrical current generator, but as any device to convert mechanical energy into any kind of energy convenient for use in the particular circumstances. It can be, for example, a pump in a hydraulic drive system, a pneumatic drive compressor, etc. The power-generating unit also comprises a central shell 4 and an annular front shell 5, with at least one input channel 6 of turbine 1, forming with a central shell 4 output channel 7 of the turbine 1, and an annular external shell 8, forming with the central shell 4 a diffuser output channel 9. The feature of the power-generating unit is that it is equipped with an additional annular shell 10, forming with the external surfaces of the front 5 and central 4 shells narrowing—extending the first intermediate channel 11, connected in the middle part with output channel 7 of turbine 3, and with the internal surface of n outside shell 8, second intermediate channel 12 connected, along with the intermediate channel 11, to the diffuser output channel 9. The back edge 13 of the external shells 8 coincides with its maximum diameter. In one of the embodiments, as illustrated in FIG. 1, input channel 6 and turbines 1 are located in the center of the front shell 5. In another embodiment, as illustrated in FIG. 2, the input channels 6 and turbines 1 are located on the cross-sectional perimeter in forward shell 5. Generator 3 may be located behind turbine 1 and in front of it. In the latter case, the generator 3 is equipped with a cowl 14. In all embodiments, the turbine may be connected to one of several generators located behind the turbine or in front of it.

The output part 15 of the additional shell 10 may be made movable, i.e., have rotational or axial displacement, to change the cross-section of the adjacent channels 11 and 12, while the output part 16 of the front shells 5 is made movable to change the cross-section of the adjacent channels 7 and 11. Parts 15 and 16 may be designed adjustable, i.e., with rotary doors and inserts. In the back edge 13 meridian plane, angle α of tangent declination to the external surface of the outside shell 8 equals to 90–120 degrees with respect to the basement shear of the shell, as illustrated in FIG. 1.

The support of the power-generating unit may be made as joint 18, e.g., cylindrical, installed on the top of column 17. Joint rotation axis is located on the front of the wind flow in one plane with the center of wind pressure P of the power-generating unit. P is a point of application of the resultant aerodynamic forces acting on the power-generating unit streamlined by a wind flow. Such design ensures turning of the power-generating unit to the wind with any direction of the latter.

Figure 3:
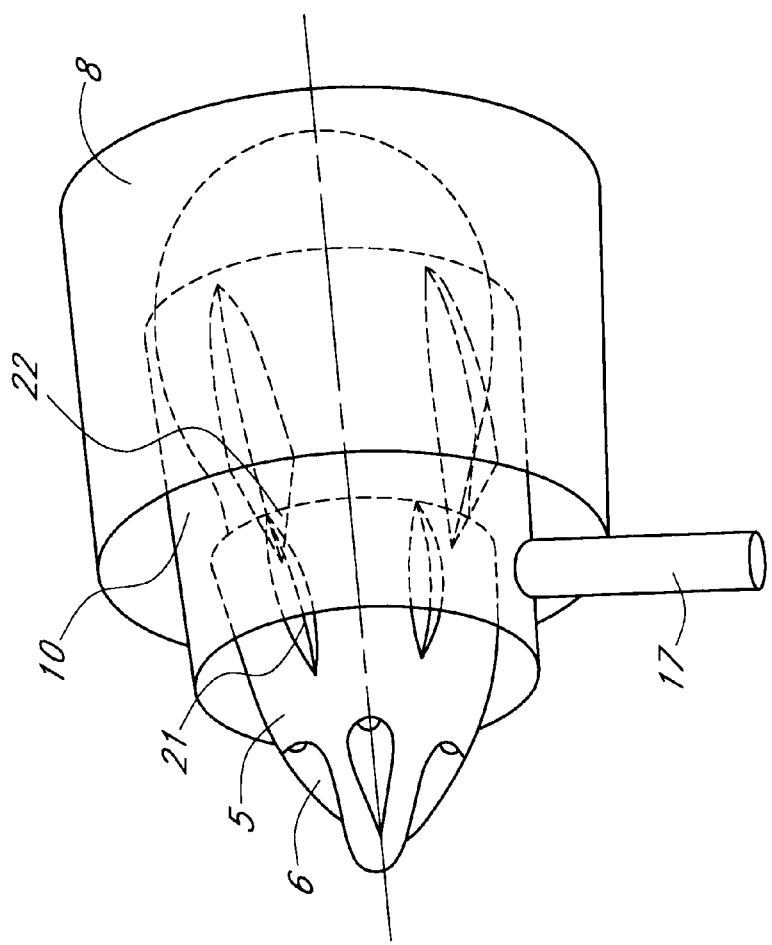
FIG. 3 shows axonometric projection of the power-generating unit of FIG. 2.
Figure 5:
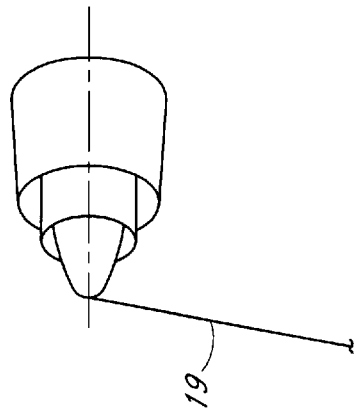
FIG. 5 attachment to a cable power-generating unit in aerostat version.
Figure 7:
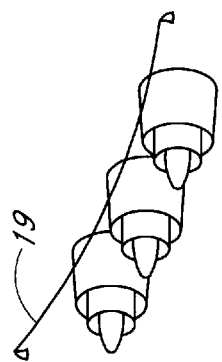
FIG. 7 illustrates the attachment of the power-generating unit on a horizontal or sloped cable.
Figure 4:
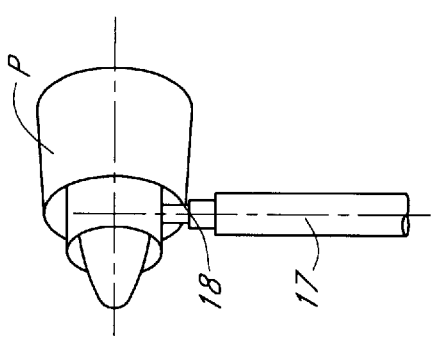
FIG. 4 shows joint attachment of the power-generating unit on the column.
Figure 6:
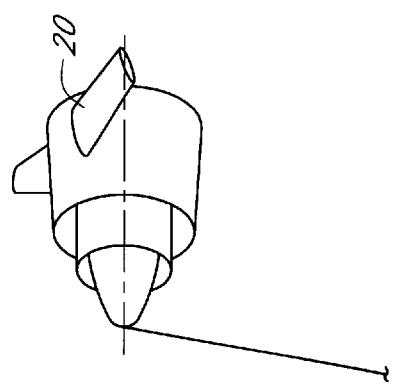
FIG. 6 shows the power-generating unit with wings.

At least one of the shells of the power-generating unit may be filled with gas which density is less than that of ambient atmosphere, such as an aerostat embodiment. In this case, the power-generating unit support may be made as a cable 19, with one end fixed to the ground and the other to the nose part of the front shell 5, as illustrated in FIG. 5. The cable 19 may be installed horizontally or with a slope and its ends are attached at artificial or natural heights as illustrated in FIG. 7. As illustrated in FIG. 6, the power-generating unit may have wings 20 to create additional lift in the wind. The power-generating unit shells are unified with the help of strips 21 and 22, as illustrated in FIG. 3.

The wind power unit operates as follows:

A free air flow moving along the surface of outside shell 8 of the unit creates, through ejection, rarefaction on the unit basement shear. The zone of effective influence of the flow creating rarefaction equals to at least one diameter of the unit basement shear, that is the process involves annular air flow which largest diameter is no less than three diameters of the unit basement shear. Energy of the flow may be determined by the first law of thermodynamics, or calculated using the formula for determination of gas elastic energy, or through other known ways. Air flow coming to the input section of the channel 12 has a certain reserve of energy calculated by known ways.

Under the effect of two energy flows, from the side leg of the input channel and from the side of the basement shear, air flow reaches maximum velocity in the minimum cross-section of channel 12 in the zone of the back edge 15 of additional shells 10. That is, kinetic energy of the flow sharply increases, and the process is related to reduction of flow enthalpy. With the increase of velocity, pressure in this cross-section reduces, and we designate the value of pressure as P<1. This pressure will be significantly lower than pressure P0 in the free flow. Pressure in the output section of channel 11 will also be equal to P1. Therefore, air channel 11 is affected by two energies: one from the side leg of the output section of channel 11 and the other, from the side of its input cross-section. Vectors of effect of these energies on the flow coincide. Interaction of these energies causes essential increase of velocity in the minimum cross-section of channel 11, in the back edge zone of front shell 5, and appropriate reduction of pressure in the zone. Thus, pressure in the output part of the channel is assume to be P1=0.85 to 0.9 P0, then pressure P2 in the minimum cross-section zone of channel will be P2=0.7 to 0.75 P0.

Pressure in the output cross-section of the air channel 6 also will be equal to P2. In the minimum cross-section of channel 6, turbine 1 is installed with directing nozzle apparatus 2. In the cross-section of the turbine, air flow velocity, through interaction of energy of air flow coming to channel of 6 and rarefaction in the output cross-section of channel 6, will reach its maximum local speed of sound or close to it.

Kinetic energy in the turbine 1 represents available work, which will be transformed into rotation of turbine 1 and to the electrical generators 3 connected to it.

The processes of energy transformation in the unit channels are identical to those occurring in Laval nozzles, and the minimum pressure of flow in the work zone of the turbine will be equal to P3=0.528 P0 or a little higher, depending on free flow velocity. Air turbines are efficient even at minor pressure differentials, and the unit will operate at free air flow velocities of V0=5 to 7 m/s, but amount of generated electric power will be less.

Thus, the suggested wind power unit, unlike the analogs considered above in the prior art embodiments, allows the use of the energy of the wind flows streamlining the unit. More effective is stepwise conversion of air flows energy resulted from simultaneous interaction on air flows in channels of both energies of flows coming to the channels and energy of rarefaction in output cross-sections thereof.

Suggested wind power units are used most effectively in regions with increased wind velocities, e.g., on islands, on marine coasts, in mountains, etc. The units may be installed in various embodiments, as illustrated in FIG. 7, on columns or towers, suspended as daisy-chains on cables, and fixed on any support in rifts. In regions where the average velocities are insignificant, the aerostat embodiment of the unit may be used by filling its pressure shells with helium, using a heated air inside the shells, or using other known ways.

Current levels of electrical engineering development allows the use of the unit with virtually with no changes, such as industrial high-speed electric generators, industrial air turbines complete with nozzle directing apparatus, e.g., air turbines of power-generating units of airplanes and other aircraft, turbodetander units, etc. To reduce time and cost of assembling the units in situ, it is advisable to produce turbine generator units fully assembled, i.e., in full factory readiness. The weight of a high-speed 1000 kW power generator does not exceed 700 kg, while the gross weight of a turbine generator unit of the same power will be hardly more than one ton. Depending on unit power and type of the units, shells of the units may be made of various materials according to well developed processes, such as composite materials, aluminum allow stock, plastic, etc. Additionally, shells may be modular, inflatable, etc.

What is claimed is:

1. A wind power unit in the form of a support-installed power-generator comprising a support, at least one turbine and mechanically connected to at least one generator, a central shell having an external surface, a front shell having an interior and exterior surface and a trailing edge and defining at least one input channel of the turbine with the front shell cooperating with the central shell to form a turbine output channel between the front shell and the central shell, and an annular external shell surrounding at least a portion of the central shell and cooperating with the central shell to form a diffuser output channel, the unit comprising:

an additional annular shell having a trailing edge, the additional annular shell cooperating with the external surfaces of the front and central shells to form a narrowing-extending first intermediate channel that is connected in an intermediate part with the turbine output channel, the additional annular shell cooperating with the internal surface of the external shell to form a second intermediate channel that is connected with the first intermediate channel and with the diffuser output channel;

a movable output part on the trailing edge of the additional annular shell, wherein the output part is movable to change a cross-section of the first and second intermediate channels, which increases the kinetic energy of the air flow through the first and second intermediate channels; and a movable output part on the trailing edge of the front shell, wherein the output part is movable to change a cross-section of the turbine output and first intermediate channels, which increases the kinetic energy of the air flow through the first and second intermediate channels.

2. The wind power unit according to claim 1, wherein a back edge of the external shell coincides with a maximum diameter of the external shell.

3. The wind power unit according to claim 1, wherein the input channel and the turbine are located in the center of the front shell.

4. The wind power unit according to claim 1 wherein plural input channels and turbines are located on a cross-sectional perimeter in the front shell.

5. The wind power unit according to claim 1, wherein the generator is equipped with a cowl and is located in the central shell and in front of the turbine.

6. The wind power unit according to claim 1, wherein the turbine is equipped with at least two generators with at least one of the generators located in front of the turbine and at least one of the generators located behind the turbine.

7. The wind power unit according to claim 1, wherein the generator is equipped with a cowl and is located in the central shell and behind the turbine.

8. The wind power unit according to claim 1, wherein the movable output part on the trailing edge of the additional annular shell and the movable output part on the trailing edge of the front shell streamline the air flow through the wind power unit to increase the rotational velocity of the at least one turbine.

9. The wind power unit according to claim 1, wherein at the back edge in a meridian plane the angle of tangent declination to an external surface of the external shell equals to 90–120 degrees with respect to the plane of the basement shear of the shell.

10. The wind power unit according to claim 1, wherein the power generating unit has a center of wind pressure, and wherein the support is made as a joint installed on a top of a column and located to have a joint rotation axis located in wind flow in front of the center of the wind pressure.

11. The wind power unit according to claim 1, wherein at least one shell is filled with gas which density is less than that of air.

12. The wind power unit according to claim 1, wherein the support is made as a cable fixed to a nose of the front shell.

13. The wind power unit according to claim 12, wherein the cable is installed with an angular displacement including horizontal and an end of the cable is fixed at one of an artificial and natural heights.

14. The wind power unit according to claim 13, wherein wings are attached to the wind power unit.

15. A wind power unit in the form of a support-installed power-generator having at least one turbine mechanically connected to at least one generator and with a front shell defining at least one input channel to the turbine, the front shell having an interior and exterior surface and a trailing edge, the unit including a central shell having an external surface and cooperating with the front shell to form a turbine output channel between the front shell and the central shell, the unit having an annular external shell surrounding at least a portion of the central shell and cooperating with the central shell to form a diffuser output channel, the unit comprising:

an additional annular shell having an interior and exterior surface and having a trailing edge, the annular shell being located intermediate the external shell and both of the central and front shells, the interior surface of the additional annular shell cooperating with external surfaces of the front and central shells to form a first annular intermediate channel that is connected in an intermediate part with the turbine output channel, the external surface of the additional annular shell cooperating with the internal surface of the external shell to form a second annular intermediate channel connected with the first intermediate channel and with the diffuser output channel;

a movable output part on the trailing edge of the additional annular shell, wherein the output part is movable to change a cross-section of the first and second intermediate channels, which increases the kinetic energy of the air flow through the first and second intermediate channels; and a movable output part on the trailing edge of the front shell, wherein the output part is movable to change a cross-section of the turbine output and first intermediate channels, which increases the kinetic energy of the air flow through the first and second intermediate channels.

16. A method for transforming energy of a first gas flow using a wind power unit in the form of a support-installed power-generator having at least one turbine mechanically connected to at least one generator, the method comprising:

accelerating the energy of a first gas flow in front of the turbine by using a component of the first gas flow, while simultaneously creating rarefaction behind the turbine by creating rarefaction across an output section of a profiled duct communicated to a minimum-section zone, where the first gas flow is affected by the component of the first gas flow streaming directly past a deflector;

streaming the first gas flow past the outer envelope to produce rarefaction in the output section due to ejection; and creating multi-stage acceleration of the first gas flow, which increases the use of the energy of the first gas flow.

17. A wind power unit in the form of a support-installed power-generator comprising a support, at least one turbine and mechanically connected to at least one generator, a central shell having an external surface, a front shell having an interior and exterior surface and a trailing edge and defining at least one input channel of the turbine with the front shell cooperating with the central shell to form a turbine output channel between the front shell and the central shell, and an annular external shell surrounding at least a portion of the central shell and cooperating with the central shell to form a diffuser output channel, the unit comprising:

an additional annular shell having a trailing edge cooperating with the external surfaces of the front and central shells to form a narrowing-extending first intermediate channel that is connected in an intermediate part with the turbine output channel, the additional annular shell cooperating with the internal surface of the external shell to form a second intermediate channel that is connected with the first intermediate channel and with the diffuser output channel; and a movable output part on the trailing edge of the additional annular shell, wherein the output part is movable to change a cross-section of the first and second intermediate channels, which increases the kinetic energy of the air flow through the first and second intermediate channels.

18. The wind power unit according to claim 17, wherein the additional annular shell has a movable output part on a trailing edge of the front shell, which the output part is movable to change a cross-section of the turbine output and first intermediate channels, which increases the kinetic energy of the air flow through the first and second intermediate channels.

19. A wind power unit in the form of a support-installed power-generator comprising a support, at least one turbine and mechanically connected to at least one generator, a central shell having an external surface, a front shell having an interior and exterior surface and a trailing edge and defining at least one input channel of the turbine with the front shell cooperating with the central shell to form a turbine output channel between the front shell and the central shell, and an annular external shell surrounding at least a portion of the central shell and cooperating with the central shell to form a diffuser output channel, the unit comprising:

an additional annular shell having a trailing edge cooperating with the external surfaces of the front and central shells to form a narrowing-extending first intermediate channel that is connected in an intermediate part with the turbine output channel, the additional annular shell cooperating with the internal surface of the external shell to form a second intermediate channel that is connected with the first intermediate channel and with the diffuser output channel; and a movable output part on the trailing edge of the front shell, wherein the output part is movable to change a cross-section of the turbine output and first intermediate channels, which increases the kinetic energy of the air flow through the first and second intermediate channels.

20. The wind power unit according to claim 19, wherein the additional annular shell has a movable output part on a trailing edge of the additional annular shell, which the output part is movable to change a cross-section of the first and second intermediate channels, which increases the kinetic energy of the air flow through the first and second intermediate channels.

* * * * *